Dec. 20, 1927.   1,653,369
D. R. MURPHY
RECIPROCATING VALVE
Filed March 17, 1924
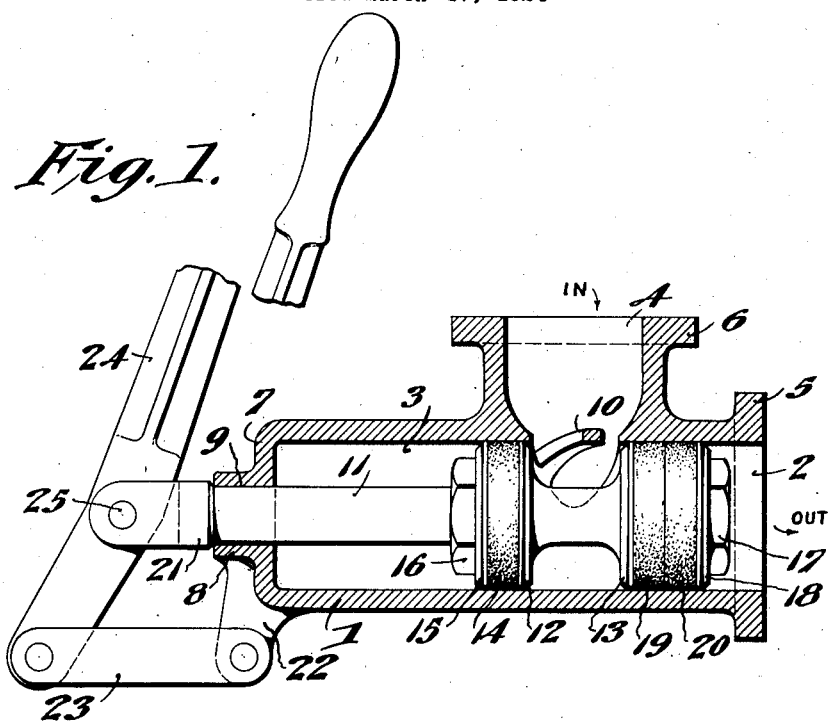
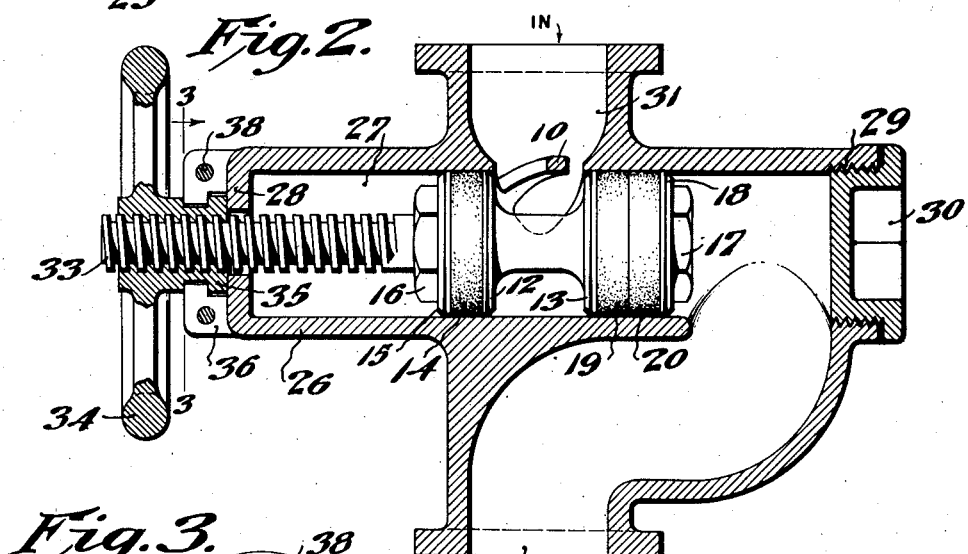
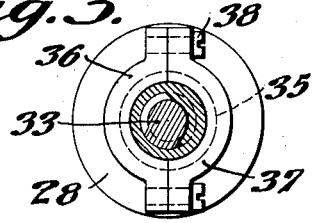
Inventor
Daniel R. Murphy
By Lloyd W. Patch
Attorney Patented Dec. 20, 1927.

1,653,369

UNITED STATES PATENT OFFICE.

DANIEL R. MURPHY, OF NEWARK, OHIO, ASSIGNOR OF ONE-FOURTH TO WILLIAM G. HANNA, OF NEWARK, OHIO, AND ONE-FOURTH TO W. H. TRUSCHEL, OF WHEELING, WEST VIRGINIA.

RECIPROCATING VALVE.

Application filed March 17, 1924. Serial No. 699,925.

My present invention relates to reciprocating valves, and particularly to a piston valve adapted for use in high-pressure air lines, in wash-out and blow-off lines as installed in railway roundhouses, in lines where the valve structure is subjected to extremes of temperature, in chemical carrying lines, and in other connections where a valve structure having metal parts working or closing against metal will not hold the fluid or liquid pressure, or where the parts would stick and corrode or be otherwise injured and rendered partially or wholly inoperative.

An object of this invention is to provide a valve structure which can be embodied in an angle valve or a straight-line valve, and which will prove highly efficient in either adaptation.

A further object resides in so constructing the parts that the reciprocating piston valve portion is balanced and is free from back or shifting pressure when in the closed relation, and that any back pressure will hold the valve portion in the open position when the line is opened.

A still further object is to provide a reciprocating or piston valve of simple and inexpensive construction, embodying few and readily assembled parts in its make up, and one which is so constructed that the piston valve portions will not be cut or scored by cylinder contact or ruptured by fluid or liquid pressure.

With the above and other objects in view, which will be apparent to those skilled in the art, my present invention includes certain novel features of construction and combinations of parts which will now be set forth in connection with the drawing.

In the drawings:

Figure 1 is a view in longitudinal section through one embodiment of my invention.

Fig. 2 is a similar view through a modified form of the valve.

Fig. 3 is a sectional view on line 3—3 of Fig. 2.

In the adaptation shown in Fig. 1, I have illustrated an angle valve with the piston valve portion shifted by the use of an operating handle or lever, and it will be appreciated that this principle of operation might be employed with the straight-line valve casing illustrated in Fig. 2, to supplement the screw and hand-wheel employed in this adaptation for shifting the piston valve.

The valve case 1, referring to the illustration in Fig. 1, is constructed to be of cylindrical form with the outlet 2 in line with the valve cylinder opening 3, and the inlet port 4 opening laterally into the cylinder opening 3. In the present instance I have shown flanges 5 and 6 around the outlet and inlet ports for connection of the pipe line, as such connections are best suited to high pressure lines; however, internal or external threads might be provided for the pipe line connections. It is preferable that the cylindrical valve case 1 be made as a single casting with the head end 7, opposite outlet 2, closed and provided with a central boss 8 having a valve stem opening 9 therethrough. Also, it is desirable that an obliquely disposed bridge 10 concentric with the cylinder opening be provided across the inlet end of port 4, to give a more even bearing upon the piston valve.

The valve stem 11 is mounted through opening 9, and at its inner extremity has the flange portions 12 and 13 spaced apart a distance slightly greater than the longitudinal extent of the bridged opening of port 4. A packing ring 14 is fitted on the stem 11 against flange 12, and is held in place thereon by washer 15 and nut 16. The extreme end of the stem 11 is threaded to receive a clamping nut 17 carrying a clamping washer 18, and packing rings are fitted over this threaded end and are held in place by the nut 17. It is preferable that two packing rings 19 and 20 be employed in this connection, as better results are attained in use.

A crosshead 21 is fitted on the end of stem 11 passing through opening 9, and inward movement of the piston valve structure is thus stopped with the valve portions in the closed relation, in which the opening of the port 4 is between the flanges 12 and 13, and the pressure is consequently balanced upon the valve. Opening movement of the valve is limited by contact of nut 16 with the head 7 of the valve case. A bearing lug 22 is provided on the case 1 at the head end, and links 23 are pivotally mounted on this lug.

An operating handle 24 is pivotally connected at the free ends of the links 23 and is extended through crosshead 21, a pin 25 connecting the crosshead and valve stem 11 to be moved as the lever is swung.

In the embodiment shown in Figs. 2 and 3, the valve case 26 has a cylindrical bore 27 therein closed at the head end 28, except for a stem opening, and internally threaded at 29, at its opposite end to receive a closing plug 30. The inlet port 31 opens laterally into the cylindrical bore 27 at substantially the same point as illustrated in Fig. 1. The outlet port 32 has its pipe connecting end at a point preferably substantially diametrically opposite to the pipe connection end of the inlet port 31, this port 32 leading in a circuitous path to open laterally into the cylindrical bore 27 at its outer end adjacent plug 30.

The valve stem 33 is here shown as being externally threaded on that end passing through the opening in the cylinder head 28, and the valve structure, including the packing rings, will be constructed and assembled upon the inner end of the stem in substantially the manner set forth above. A hand-wheel 34 has a central bore through its hub and is internally threaded to receive the threaded end of stem 33. The hub of the hand-wheel has a swivel flange 35 on its inner end, and a swivel bearing portion 36 is provided on the head 28 concentrically around the stem opening. The flanged portion of the wheel hub is fitted laterally into this bearing portion and is then turned onto the stem 33, and to give an even bearing for the flange portion of the wheel hub, I provide a bearing member 37 to be fitted upon the bearing portion 36, and held in the proper relation by screws or other fastenings 38.

With this modified construction, the valve can be connected in a continuous or straight pipe line, and the hand-wheel 34 and threaded stem 33 will permit the valve to be opened and closed gradually, the hand-wheel serving to retain the valve in positions to give any width or degree of opening from the inlet port. When the valve is closed, as shown in the drawing, the fluid or liquid pressure will be balanced between the packing ring portions and strain upon the parts will thus be relieved.

By arranging the parts in the manner set forth with the valve entirely clearing the inlet port, when moved to the open position, and leaving the cylinder end entirely open and clear from the inlet to the outlet, I obtain a full capacity flow through the pipe line. The valve structure is entirely removed from the path of flow of the fluid or liquid and the only impediment is a slight frictional resistance, this resistance in no instance being greater than would be encountered in an ordinary L-connection or angle fitting.

While I have herein shown and described only two particular embodiments of my improved valve structure, and have mentioned only certain possible uses and certain possible modifications, it will be appreciated that changes and variations can be made in the form, construction, and assembly of the parts to suit different conditions of installation, without departing from the spirit and scope of my invention.

I claim:

1. A reciprocating valve including a casing having a cylindrical longitudinal opening provided with a lateral inlet opening intermediate its ends, and an outlet opening at its outer end, a reciprocating piston valve mounted in the longitudinal opening, and an obliquely extending bridge across the inlet opening concentric with the cylindrical opening for guiding the valve.

2. A reciprocating valve including a casing having a longitudinal opening therethrough provided with a lateral inlet opening intermediate its ends, and an outlet opening at its outer end, the opposite end of said casing having an integral end closure provided with an outstanding boss, said closure and boss having a valve-stem opening therethrough, a reciprocating valve-stem mounted in the last-mentioned opening, an integral lug extending from the boss and end closure, a link pivoted to said lug, and a lever pivoted to the valve-stem and to the link for reciprocating said valve-stem.

In testimony whereof I hereunto affix my signature.

DANIEL R. MURPHY.